Oct. 26, 1971    H. F. WUENSCHER    3,614,899
HERMETICALLY SEALED ELBOW ACTUATOR
Filed Aug. 25, 1969
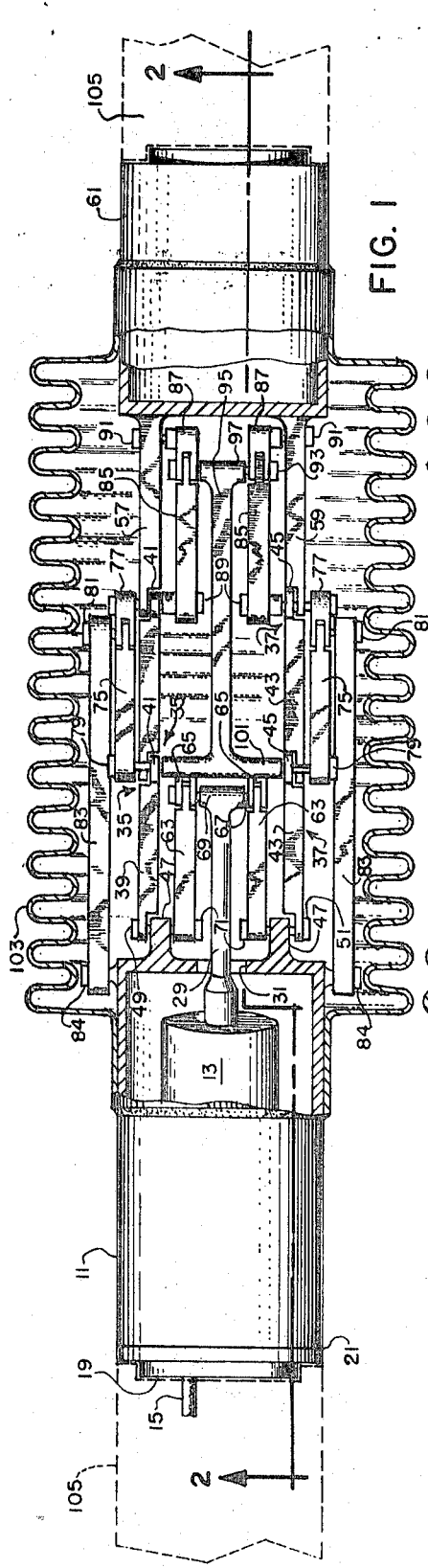
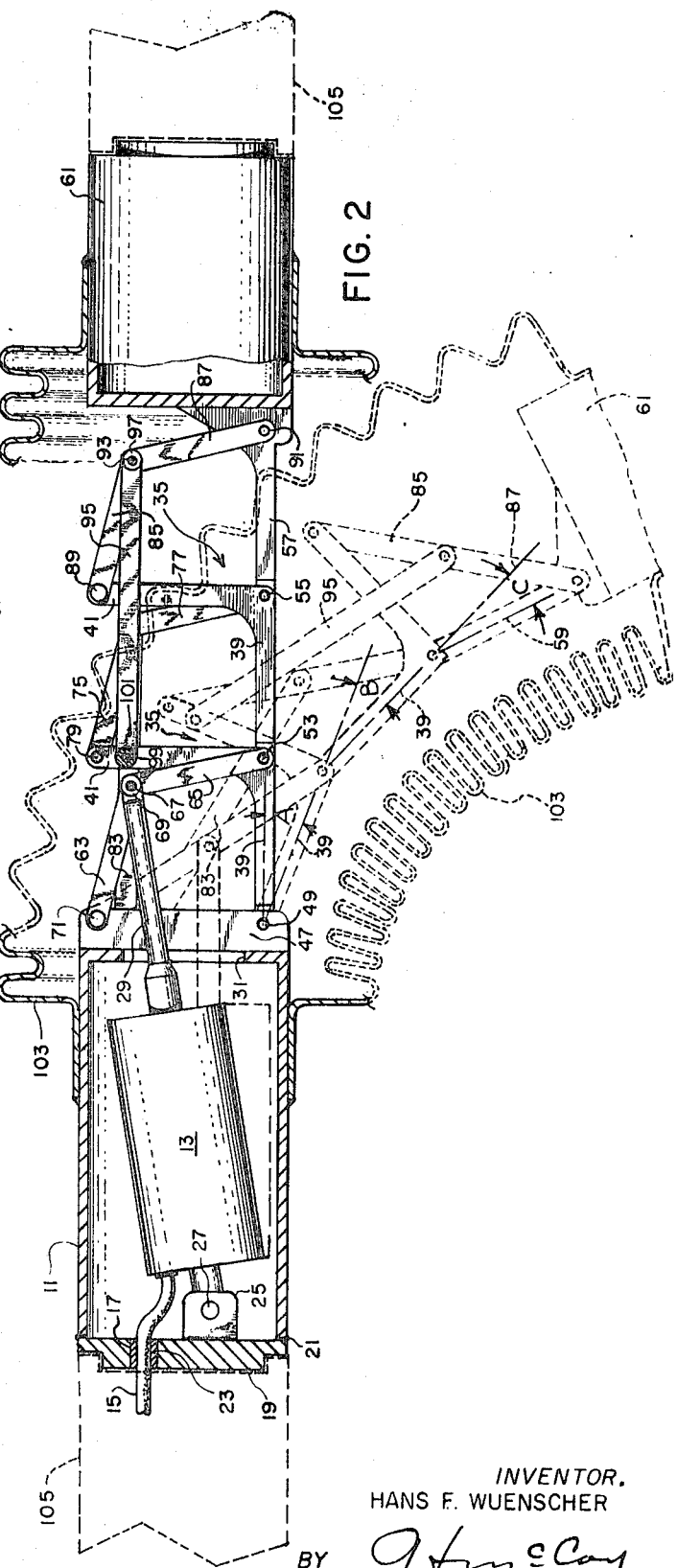
INVENTOR.
HANS F. WUENSCHER
BY
*H. McCoy*
*Wayland H. Riggins*
ATTORNEYS United States Patent Office 3,614,899
Patented Oct. 26, 1971

3,614,899
HERMETICALLY SEALED ELBOW ACTUATOR
Hans F. Wuenscher, Huntsville, Ala., assignor to the United States of America as represented by the Administrator of the National Aeronautics and Space Administration
Filed Aug. 25, 1969, Ser. No. 852,843
Int. Cl. F16h *15/50, 21/44;* G05g *1/04*
U.S. Cl. 74—105           6 Claims

ABSTRACT OF THE DISCLOSURE

A hermetically sealed elbow actuator comprising first and second pairs of pivotally connected angular actuating elements arranged between a base member and a head member. The base member houses a motor that forces incremental deflection of the actuating elements and the head member through a system of drive rods and expandable linkages. Limited deflection of each pair of actuating elements permits all of the moving parts, including the motor, to be hermetically sealed by a metallic bellows since the deflection of each pair of actuating elements is small enough to be within the bending tolerance of the bellows.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to actuator mechanisms and more particularly to an actuator for producing bending motion wherein all of the moving parts of the actuator are hermetically sealed.

The increasing activity in space and undersea exploration has among other things, focused attention and consideration on performing various kinds of work in these environments. The manufacture of products in the zero gravity environment of space is now a promising prospect since it is believed that certain products can be manufactured in this environment which would surpass in precision and quality standards that which could possibly be obtained in earth manufacturing. Manufacturing in space will involve the development of special tools and mechanical means that are capable of withstanding the vacuum environmental extreme temperature conditions. For example, actuators for transferring and maneuvering personnel and equipment in space will be required. It would be highly advantageous from the standpoint of durability and reliability if the moving parts of such actuators could be permanently hermetically sealed to protect the moving parts from extreme environmental conditions and to provide for permanent lubrication of the moving parts.

Prior actuators capable of producing bending motion over a large angle typically do not incorporate hermetic sealing around all of the moving parts of the actuator. This is because the relative motion between the moving parts, for example, the drive shaft of a motor and the gears driven by the motor, is too great for hermetic sealing of all the parts within a flexible enclosure such as a bellows-type enclosure. Ordinally the gears or other force transmitting members are enclosed in a protective housing, either rigid or flexible, and an externally driven rotary drive shaft penetrates the housing so that a seal is required to prevent leakage of the housing around the drive shaft. These dynamic seals are inherently subject to wear and leakage even in a favorable environment and the likelihood of failure of these seals would be greatly increased in space or salt water environments. In the case of actuators used in space manufacturing it is particularly important that maintenance and repair requirements be held to a minimum.

It is deemed preferable that all of the moving parts of actuators to be used in space, salt water or other severe chemical and temperature environments be hermetically sealed within a highly durable, high strength metal enclosure such as a metal bellows. Such a bellows would be restricted in its elastic capability and the moving parts within the bellows would have to bend or make angular changes in small increments so that the bellows could conform to the bending curvatures without exceeding its elastic capability. An example of a space working tool in which a hermetically sealed actuator could be used is a "serpentuator" disclosed in my copending application, Ser. No. 702,396, filed Feb. 1, 1968 now Pat. No. 3,520,496.

SUMMARY OF THE INVENTION

The invention comprises an elbow actuator for producing deflection of a head member associated with the actuator wherein all of the moving parts of the actuator mechanism are hermetically sealed in a metal bellows. The moving parts comprise a motor having a drive shaft connected to the first of a plurality of actuating elements with each actuating element pivotally connected to an adjacent element. The adjacent actuating elements are also interconnected by a force transmitting system that transmits the driving force from the first actuating element to a second actuating element and the deflecting head member. The relationship between the force transmitting system and the actuating elements causes the elements to deflect or rotate relative to each other in small increments so that the bending curvature is gradual and does not exceed the elastic capability of the metal bellows.

Accordingly, it is a general object of the present invention to provide an actuator for producing bending or rotary motion which incorporates hermetic sealing of all the moving parts of the actuator.

Another object of the invention is to provide an elbow actuator that is particularly adapted for use in severe environmental conditions such as in the vacuum of space or the salt water environment of the ocean or in other severe chemical and temperature environments.

Another object of the invention is to provide an elbow actuator wherein adjacent moving parts of the actuator move in relatively small increments so as to permit the moving parts to be enclosed by a highly durable metal bellows having limited elastic capability.

These and other objects and advantages of the invention will become apparent upon reference to the following specification, attendant claims and drawing.

BRIEF DESCRIPTION OF THE DRAWING

FIG. 1 is a view, partially in cross section, of a hermetically sealed elbow actuator embodying the present invention.

FIG. 2 is a cross-sectional view taken along line 2—2 of FIG. 1 including a broken line illustration of the elbow actuator in the deflected position.

DESCRIPTION OF THE PREFERRED EMBODIMENT

Referring to FIGS. 1 and 2, the elbow actuator shown therein comprises an elongated hollow base member 11 that houses a motor 13 energized through an electric cable 15. The cable 15 enters the member 11 through an opening 17 in an end plate 19 of the base member which is joined to the base member by welding 21. A sealing material 23 is provided to form a hermetic seal around the cable 15.

The motor 13 is pivotally connected to the end plate 19 through a connecting lug 25 and a pivot pin 27 and has a linearly movable shaft 29 that extends through a vertical slot 31 in the end of the base member 11. The shaft 29 is the primary drive member for the elbow actuator as will appear subsequently.

Interconnected with the base member 11 and the motor shaft 29 are a plurality of angle shaped actuating elements 35 and 37. The actuating elements 35 comprise a horizontal leg 39 and a vertical leg 41, while the actuating elements 37 comprise a horizontal leg 43 and a vertical leg 45. The horizontal leg 39 of one of the actuating elements 35 is pivotally connected to the base member 11 through a flange 47 and a pivot pin 49. Similarly, the horizontal leg 43 of one of the actuating elements 37 is pivotally joined to the base member 11 through a second flange 47 and pivot pin 51. Thus the actuating elements 35 and 37 constitute a first pair of laterally spaced elements pivotally connected to the base member 11.

A second pair of actuating elements 35 and 37 are pivotally connected to the first pair with the horizontal legs 39 and 43 pivotally connected to the corner portions of the preceding elements by pivot pins 53. Pivotally connected to the corner portions of the second pair of actuating elements by pins 55 are a pair of horizontal legs 57 and 59 that join rigidly with a hollow head member 61.

Disposed between the first pair of actuating elements 35 and 37 are two laterally spaced linkage assemblies with each assembly comprising angularly related linkages 63 and 65 pivotally connected by a transverse pin 67 extending between the linkage assemblies. The pin 67 also extends through a sleeve 69 that is an integral part of the motor shaft 29. Each of the linkages 63 is connected by a pivot pin 71 to the upper part of the corresponding flange 47, and the linkages 65 are connected to the corner portions of the first pair of actuating elements 35 and 37 by the pivot pins 53 that join the first and second pair of actuating elements.

Along the outside of each of the second pair of actuating elements 35 and 37 is a linkage assembly comprising linkages 75 and 77. The linkages 75 are pivotally connected by pins 79 to the upper ends of the vertical legs 41 and 45 of the first pair of actuating elements 35 and 37. The linkages 77 are connected to the corner portions of the second pair of actuating elements 35 and 37 by the pivot pins 55 that join the second pair of actuating elements to the horizontal legs 57 and 59. The linkages 75 and 77 are connected by pivot pins 81 at substantially the same angle as the linkages 63 and 65. Horizontal drive rods 83 are also pivotally joined by the pins 81 to the linkages 75 and 77 and the rods extend to the base member 11, being pivotally connected to pins 84.

A third set of linkage assemblies, each comprising linkages 85 and 87, are incorporated between the horizontal leg members 57 and 59 of the head member 61. One of the linkages 85 is joined by a pivot pin 89 to the upper end of the vertical leg 41 of the second pair of actuating elements 35 and the other linkage 85 is likewise joined to the vertical leg 45 of the second pair of actuating elements 37. The two linkages 87 are connected to the leg members 57 and 59 by pivot pins 91. The linkages 85 and 87 are joined at the same angular relationship as the preceding linkages by pivot pins 93 extending between the two linkage assemblies.

A drive rod 95 has an integral sleeve 97 fitted rotatably over the pivot pin 93 and the rod 95 extends substantially horizontally from the pin 93 to a pin 99 spanning between and joined to the vertical legs 41 and 45 of the first pair of actuating elements 35 and 37. An integral sleeve 101 of the drive rod 95 is rotatably fitted over the pin 99.

Enclosing the length of the elbow actuator between the base member 11 and the head member 61 is a flexible bellows 103 made of a high strength metal such as stainless steel or titanium. The bellows is welded to the base member and the head member so as to form with these members an airtight enclosure for the various moving parts of the actuator.

The airtight enclosure of the actuator may be filled with an inert gas such as nitrogen or helium to prevent vaporization of the lubricant for the moving parts and to protect the parts themselves from contamination and corrosion.

OPERATION

The elbow actuator operates as follows:

When it is desired to introduce a downward bend between the base member 11 and the head member 61, the motor 13 is energized to cause the drive shaft 29 to retract. As the shaft 29 retracts the linkages 63 and 65 are expanded toward a 180° angle with each other which causes a downward rotation of the first pair of actuating elements 35 and 37. When the motor shaft 29 is fully retracted, the first pair of actuating elements will have rotated through an angle A as illustrated in broken line in FIG. 2. The motor 13 and motor shaft 29 also rotate downwardly.

Simultaneous with the rotation of the first pair of actuating elements 35 and 37, the second pair of actuating elements will deflect through the angle A and will also rotate an additional amount indicated by the angle B. The head member 61 will rotate through the angles A and B plus an additional angle C. The additional rotation of the second pair of actuating elements 35 and 37 is caused by the expansion of the linkages 75 and 77 under force imposed by the rotating drive rods 83 which expand the linkages 75 and 77 in the same manner as the motor shaft 29 expands the linkages 63 and 65. The additional rotation of the head member 61 through the angle C is similarly caused by expansion of the linkages 85 and 87 forced by the rotating drive rod 95.

It is apparent that the total downward deflection of the head member 61 relative to the base member 11 is the sum of the incremental deflections, i.e. angles A, B and C. Since the actuating elements divide the total deflection angle of the head member 81 into increments, the bending radius between the ends of the metallic bellows 103 is within the elastic capability of the relatively stiff but durable metal bellows.

To return the head member 61 to the horizontal position the motor shaft 29 is extended to the position shown in solid line in FIG. 2. To deflect the head member 61 upwardly from the horizontal position the motor shaft 29 is extended beyond the position shown in solid line in FIG. 2 and the actuating elements 35 and 37 will rotate upwardly rather than downwardly and the respective linkages will converge rather than expand. The basic angular relationship between the linkages may be varied to produce varying deflections of the actuating elements 35 and 37 as well as the head member 61.

The deflected condition of the elbow actuator is indicated in broken lines in FIG. 2. Additional gradual deflection of a head member, such as member 61, may be effected by the present invention by incorporating additional actuator elements, with guide rods and linkages, between the base member and the head member.

The disclosed elbow actuator is adapted to be incorporated in other devices, such as in the hinge connections of a "serpentuator" disclosed in my copending application, Ser. No. 702,396, filed Feb. 1, 1968, now Pat. No. 3,520,496. Thus, the base member 11 and the head member 61 may be joined to additional members 105 shown in broken line.

What is claimed is:

1. A hermetically sealed elbow actuator comprising:
   (a) a base member and a head member spaced apart and defining the length of said elbow actuator;
   (b) a plurality of adjacent actuating elements disposed between said base member and said head member;
   (c) said actuating elements being movably interconnected with each other and with said base member and said head member;
   (d) each of said actuating elements comprising two angularly related legs, said legs being rigidly joined whereby the angular relation between said legs is fixed;
   (e) means including a primary drive member for deflecting each of said actuating elements in the same direction whereby a series of deflections form a gradual bend between said base member and said head member;
   (f) said means for deflecting said actuating elements further including a plurality of pivotally connected linkages extending between and pivotally joined to said adjacent elements;
   (g) means for hermetically enclosing said actuating elements and said primary drive member;
   (h) said enclosing means comprising a metallic bellows extending over the length of said actuator occupied by said actuating elements.

2. The invention as defined in claim 1 wherein said metallic bellows is hermetically secured to said base member and said head member.

3. The invention as defined in claim 1 wherein said base member comprises a rigid housing containing a motor, said primary drive member comprising a linearly movable shaft incorporated in said motor, means including said metallic bellows for hermetically sealing said motor in said housing.

4. The invention as defined in claim 3 wherein said motor is pivotally supported in said housing whereby said motor may deflect upon linear movement of said primary drive member.

5. The invention as defined in claim 1 wherein said actuating elements are arranged in laterally spaced pairs, one pair of said elements being pivotally connected to said base member.

6. The invention as defined in claim 1 wherein the hermetically enclosed region of said elbow actuator is filled with an inert gas.

References Cited

UNITED STATES PATENTS

| | | | |
|---|---|---|---|
| 2,414,774 | 1/1947 | Spinks | 74—521 |
| 2,551,847 | 5/1951 | Nelson | 74—17.8 |
| 2,725,578 | 12/1955 | Keller | 74—521 |
| 2,865,523 | 12/1958 | Morrison | 74—521 |
| 2,895,165 | 7/1959 | Fry, Jr. | 74—105 |
| 3,247,731 | 4/1966 | Chapman | 74—18.1 |

WILLIAM F. O'DEA, Primary Examiner

W. S. RATLIFF, JR., Assistant Examiner